United States Patent [19]

Carlsson

[11] Patent Number: 4,595,116
[45] Date of Patent: Jun. 17, 1986

[54] OPENING ARRANGEMENT FOR PACKING CONTAINERS AND A METHOD FOR THE MANUFACTURE OF THE SAME

[75] Inventor: Lars Carlsson, Blentarp, Sweden

[73] Assignee: Tetra Pak International AB, Lund, Sweden

[21] Appl. No.: 708,823

[22] Filed: Mar. 6, 1985

[30] Foreign Application Priority Data

Mar. 21, 1984 [SE] Sweden ............................ 8401558

[51] Int. Cl.⁴ .......................................... B65D 41/00
[52] U.S. Cl. ................................. 220/359; 220/270; 220/260; 229/43
[58] Field of Search ............... 220/260, 258, 269, 270, 220/359; 229/43; 206/604, 628

[56] References Cited

U.S. PATENT DOCUMENTS 4,372,460  2/1983  Brochman et al. ................. 220/260
4,500,011  2/1985  Brochman ........................... 220/270

*Primary Examiner*—G. T. Hall
*Attorney, Agent, or Firm*—Burns, Doane, Swecker & Mathis

[57] ABSTRACT

An opening arrangement on packing containers is provided with thermoplastic layers, which in general are present on both sides of packing laminate and extend past a cut edge and are sealed in a liquid-tight manner to each other. This can be achieved simplest if the hole-punching of the carrier layer of the material is done prior to the application of the thermoplastic layers.

10 Claims, 5 Drawing Figures

OPENING ARRANGEMENT FOR PACKING CONTAINERS AND A METHOD FOR THE MANUFACTURE OF THE SAME

BACKGROUND AND SUMMARY OF THE INVENTION

The present invention relates to an opening arrangement for packing containers of the type which are used for liquid contents and which are manufactured wholly or partly from a packing laminate comprising layers of fibrous carrier material and thermoplastics, this opening arrangement comprising a prepared pouring opening and a tear-off cover strip applied over the same.

The invention also relates to a method for the manufacture of an opening arrangement of this type.

Packing containers of the non-returnable type are used to an increasing extent for the packaging of liquid foodstuffs such as milk, juice and wine. In general the packing containers are formed from a prefabricated, laminated packing material which comprises a carrier layer of fibrous material, e.g. paper, which at least on one, and usually on both, rides is covered with liquid-tight layers of thin thermoplastic material, e.g. polyethylene. Packing laminate of this type is of a total thickness of approx. 0.4 mm and is therefore very flexible and apt to be converted by folding and heat-sealing to individual packing containers of the desired, e.g. parallelepipedic shape. The packing containers are usually also provided with some form of opening arrangement, e.g. a tearing or cutting indication or a tear-off cover strip (so-called pull-tab) which is sealed in a liquid-tight manner over a pouring opening in the packing container wall.

An opening arrangement of the type which comprises a pouring opening prepunched into the material and a tear-off cover strip applied over this in a liquid-tight manner has many advantages in that it is easy to handle, apt to be applied to the packing material beforehand, that is to say while the same is still in form of a web prior to conversion to individual packing containers, and low in cost. In the packaging of liquid contents it has to be ensured, however, that the edge of the packing laminate exposed on punching the holes is protected in a suitable manner from the contents, since otherwise these will be absorbed by the fibrous carrier layer so that the laminate is loosened up and acquires inferior strength and appearance. To prevent absorption it is customary, therefore, in this type of packing container to apply, beside the outer cover strip, also an inside protective layer, e.g. of thermoplastic material, which is present on the side of the packing laminate facing towards the contents and covers the pouring opening as well as the area around the same. The cover layer is sealed to the cover strip via the pouring opening so that the cover layer breaks in connection with the tearing off of the cover strip thus making possible the pouring out of the contents through the pouring opening. However, as a result the cut edge of the laminate previously covered is also exposed so that a certain absorption will take place when the contents during pouring come into contact with the cut edge. This is undesirable for hygienic and aesthetic reasons.

In the packaging of sterile contents, e.g. sterile milk, aseptic packages are used which, by and large, are of the same design and formation as the packing container described above. However, the packing laminate here comprises usually one or more further layers in order to improve the gas-tightness of the laminate. As a gas barrier in general a metal foil, e.g. an aluminium foil, is used which is applied to the inside of the laminate and is covered by a further layer of thermoplastic material, e.g. polyethylene. Here it is particularly important to avoid any contact between the metal foil and the contents, not only during the storage of the contents in the closed packing container but also during the pouring out of the contents and storage of remaining contents in the opened package. This applies in particular to acid types of contents, e.g. juice and wine, since contact between these contents and metal foil brings about a chemical change which affects the flavour of the product. This is true not only during the storage of the contents in the packing container before the opening of the same but also on pouring out, since any residues of contents which "get stuck" around the pouring opening, after a prolonged contact with the metal foil, may drop back into the package or in each case are carried along in subsequent pourings out of the contents.

Previous solutions designed to overcome the aforementioned problem in aseptic packing containers with prepunched pouring opening and tear-off cover strip have been relatively complicated and included an internal cover layer in the form of a laminated strip which not only should prevent any contact of the contents with the cut edge of the pouring opening, but also ensure that a satisfactory gas barrier is formed between the contents and the said cut edge, since otherwise a gas exchange with the surrounding atmosphere may ensue via the cut edge and the outer thermoplastic layer of the packing laminate. The gas barrier layer (metal foil) of the laminate is situated on the inside of the laminate. A known gas-tight and liquid-tight internal strip thus comprises a layer of polyvinylidene chloride serving as a gas barrier which via intermediate sealing layers of EVA (ethylenevinyl alcohol) is coated on both sides with polyethylene. Such a strip is relatively expensive and has been found, moreover, to be subject to two disadvantages, namely on the one hand that the different strip layers will delaminate from one another on opening of the packing container so that only certain layers join the cover strip when the latter is torn off, which means that remaining layers hinder the pouring out of the contents, on the other hand that very small cracks or holes (so-called pinholes) are formed opposite the cut edge of the packing laminate on application of the internal layer or strip. This appears to be due to the strip in this region being subjected to a stretching at the same time as it is heated to be sealed to the internal thermoplastic layer of the laminate as well as to the external cover strip via the pouring opening.

It is an object of the present invention to provide an opening arrangement of the aforementioned type which is suitable also for aseptic packages and which is not subject to the disadvantages which have been described in connection with known opening arrangements.

It is a further object of the present invention to provide an opening arrangement where the edge of the pouring opening is protected in such a manner that high gas and liquid-tightness is obtained without any internal covering layer having to be used.

It is a further object of the present invention to provide an opening arrangement which meets the extremely high demands which are made on packing containers for sterile products.

These and other objects have been achieved in accordance with the invention in that an opening arrangement has been given the characteristic that the edge of the carrier layer material facing towards the pouring opening is covered by means of thermoplastic layers present on both sides of the carrier layer which meet each other and are joined in a liquid-tight manner in a seal extending around the pouring opening.

By the design of the opening arrangement in accordance with the invention it becomes possible to guarantee a high liquid-tightness and to prevent the contents from being absorbed into the carrier layer of the packing laminate in the region around the pouring opening, at the same time as the opening arrangement, when it is used on a packing laminate with gas barrier layer, gives a high gastightness and prevents contact between the contents and the gas barrier layer.

It is a further object of the present invention to provide a method for the manufacture of the abovementioned opening arrangement.

It is a further object of the present invention to provide a method of manufacture which makes it possible in a simple and effective manner to provide a packing laminate with liquid-tight and gas-tight opening arrangements, this method being suitable to be used in the manufacture on very high speed machines.

These and other objects have been achieved in accordance with the invention in that a method for the manufacture of an opening arrangement for packing containers of the type which are used for liquid contents and which are manufactured wholly or partly from a packing laminate comprising layers of fibrous carrier material and thermoplastics, this opening arrangement comprising a prepared pouring opening and a tear-off cover strip applied over the same, has been given the characteristic that the carrier layer of the packing material is provided with a hole of a predetermined shape and size, whereupon the carrier layer is coated with the required layers of gas-tight or liquid-tight material so that the carrier layer receives at least one layer of thermoplastic material on each side, these layers being made to form a seal with each other through the application of heat and pressure, whereupon a second hole is cut out at the same place as the first mentioned hole, this second hole, however, being of a slightly smaller size so that a pouring opening is formed whose extent is limited by remaining parts of the external thermoplastic layers of the laminate sealed to each other, whereupon an external cover strip is sealed, so that it can be torn off, to the outside of the packing laminate over the pouring opening.

The method in accordance with the invention permits the manufacture of opening arrangements containing a pouring opening and a cover strip where the cut edge of the packing laminate extending around the pouring opening is effectively protected from the contents.

Preferred embodiments of the arrangement as well as the method in accordance with the invention will now be described in more detail with special reference to the enclosed schematic drawing which in great enlargement shows cross-sections through a packing laminate comprising the opening arrangement in accordance with the invention in more or less complete condition. For the sake of clarity the drawing shows only the parts which are essential for an understanding of the invention.

DETAILED DESCRIPTION OF THE PREFERRED EMBODIMENTS

Figure 1:
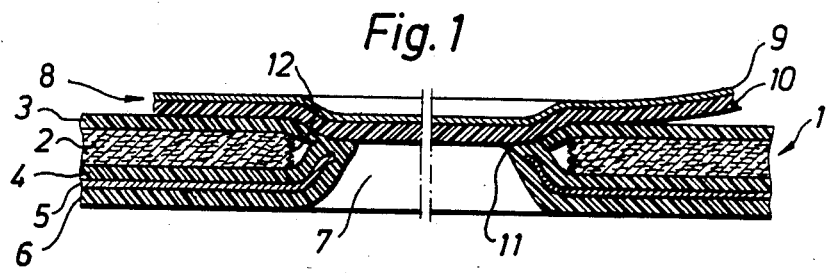
FIG. 1 shows a cross-section through a first embodiment of an opening arrangement in accordance with the invention in shut position.

The first emodiment of the opening arrangement in accordance with the invention shown in FIG. 1, like the other embodiments, is intended first and foremost for use on a packing container of a known type which is manufactured from a flexible packing laminate in the form of a web or sheet. This type of packing container is generally of a more or less parallelepipedic shape and the opening arrangement is suitably placed on the upper surface of the packing container near one of the edge lines which delimit the upper surface from adjoining packing container walls.

The packing laminate from which known packing containers of the abovementioned type are generally made is shown partially in the enclosed drawing and has been given the reference designation 1. The packing laminate comprises a carrier layer 2 of fibrous material, e.g. paper. On both sides of the carrier layer there are liquid-tight layers 3, 4 of thermoplastic material, e.g. polyethylene. When the packing laminate is to be used for the manufacture of aseptic packages, e.g. packing containers which are intended for the packaging of sterile products, a gas barrier layer 5 in the form of a metal (aluminium) foil or some other suitable material with good gas barrier properties is added, this layer being joined to the internal thermoplastic layer 4 of the packing material. Inside the gas barrier layer 5 (that is to say towards the inside of the packing container) there is a further layer 6 of thermoplastic material which is liquid-tight and prevents any contact between the contents and the gas barrier layer 5.

In accordance with the invention the packing laminate 1 moreover comprises a pouring opening 7 cut out at a suitable place which extends through all the material layers of the packing laminate 1. Over the pouring opening 7 a cover strip 8 placed on the outside of the packing laminate is present which comprises a barrier layer 9 of e.g. aluminium foil and a layer 10 of thermoplastics, e.g. polyethylene, laminated to it. The thermoplastic layer 10 of the cover strip 8 and the external thermoplastic layer 3 of the packing laminate are heat-sealed to each other in a liquid-tight seal extending around the pouring opening 7. The pouring opening 7 is thus closed in a liquid-tight manner, at the same time as the seal between the cover strip and the packing laminate can be simply broken when the packing container is to be opened and the contents poured out through the opening 7.

With the object of improving the liquid-and gas-tightness of the packing container in the region of the opening arrangement, the thermoplastic layers 3, 4 and 6 of the packing laminate are joined in liquid-tight manner to each other in a seal 11 extending around the pouring opening which ensures that the thermoplastic layers completely cover and seal off the edge 12 of the carrier layer 2 facing towards the pouring opening. This is essential, since otherwise contents could penetrate into the fibrous carrier layer 2 via the cut edge 12 which would have a detrimental effect on the packing laminate from a point of view of strength as well as of hygiene. In order to prevent also any gas exchange between the contents and the surrounding atmosphere, the gas barrier layer 5, has been folded in conjunction with the establishment of the seal around the cut edge 12 in the direction towards the cover strip 8 and been completely enclosed in the thermoplastic layers 3, 4, 6 sealed to one another. In this way the barrier layer 5 has been given an optimum shape in order to prevent in conjunction with the barrier layer 9 present in the cover strip 8 in an effective manner any passage of gas in the opening region. At the same time in the region of the pouring opening 7 the gas barrier layer 5 has been totally enclosed by thermoplastics, which is essential in order to prevent any contact between the gas barrier layer and the contents, this being particularly inappropriate in cases where the gas barrier layer consists of a metal foil.

Figure 2:
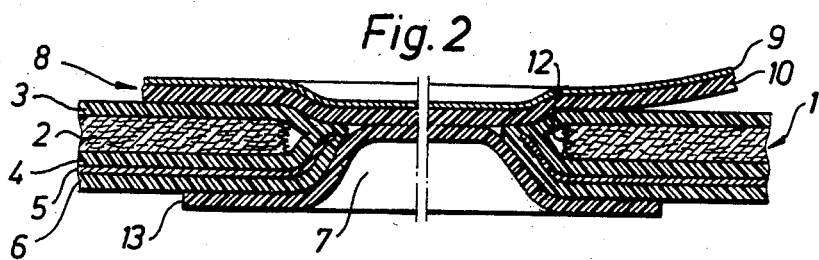
FIG. 2 shows a cross-section through a second embodiment of the opening arrangement in accordance with the invention in shut position and, FIGS. 3a, b and c show three consecutive stages in the manufacture of a pouring opening of the type which forms part of the opening arrangement in accordance with the invention.

The second embodiment of the opening arrangement in accordance with the invention shown in FIG. 2 substantially agrees with that shown in FIG. 1; corresponding parts, therefore, have been given corresponding reference designations. Beside the material layers and details described in connection with the embodiment shown in FIG. 1, and which will not be described especially in connection with FIG. 2, the second embodiment of the opening arrangement comprises a further sealing layer 13 which is in the form of a separate liquid-tight thermoplastic strip sealed to the internal thermoplastic layer 6 of the packing laminate and which preferably also consists of polyethylene. The sealing layer 13 covers the side of the pouring opening 7 facing towards the interior of the packing container in a liquid-tight manner, since it is joined to the internal thermoplastic layer 6 of the packing laminate by heat-sealing in a region extending around the pouring opening 7. The sealing layer 13, moreover, is joined by heat-sealing to the internal thermoplastic layer 10 of the cover strip 8 which means that the part of the sealing layer 13 sealed to the cover strip is removed together with the cover strip 8 when the packing container is to be opened. To ensure that the desired part of the sealing layer is jointly removed a weakening line may possibly extend around a central portion of the sealing layer 13 sealed to the cover strip 8.

What has been said above concerning the gas-and liquid-tightness of the first embodiment is also true of the second embodiment, except that here the safety against leakage of liquid has been further increased through the provision of the sealing layer 13. If further safety is required, also against the leakage of gas, the sealing layer 13 can be provided, of course, with further barrier layers against gas. This second embodiment, however, is more complicated to manufacture and will be justified only in exceptional cases, since the first embodiment already provides excellent gas and liquid tightness which is satisfactory in all normal types of aseptic packages e.g. for milk, juice or other foodstuffs which have been sterilized or have been treated in some other manner to improve keeping properties.

Figure 3A:
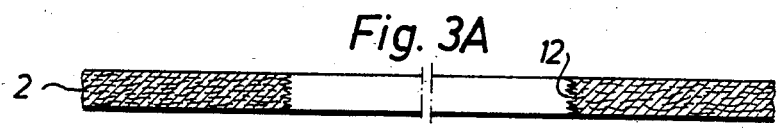
Figure 3B:
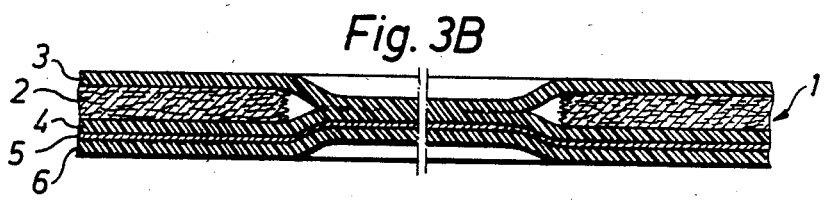
Figure 3C:
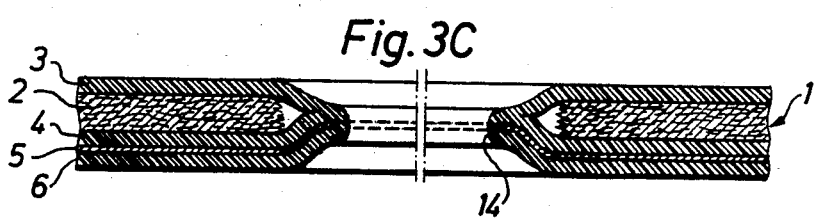

The manufacture of the opening arrangement in accordance with the invention takes place, as mentioned earlier, already in conjunction with the manufacture of the packing laminate which subsequently is converted to a packing container of the desired shape. This type of packing laminate comprises a carrier layer of fibrous material, which is fed to a laminator, in the form of a coherent paper web. The carrier layer is provided first with holes which are punched out to form the pouring opening of the finished packing container. The holes are distributed in a known manner in such a pattern that they obtain the desired location on the finished packing container. After the carrier layer has been provided with holes of the predetermined shape and size it is coated with the layers 3, 4 of thermoplastic material mentioned previously. These layers are applied to both sides of the carrier layer 2 through extrusion of heated thermoplastic material via a die extending transversely over the web, whereupon the carrier layer, as well as the thermoplastic layer just applied, are passed between two cooling rollers pressed against each other so that the thermoplastics partially penetrates into the carrier layer and in a reliable manner is joined to the same. In cases where a gas barrier layer 5, e.g. of aluminium foil, is desired the same is supplied in the form of a web and is applied to the one thermoplastic layer, whereupon a further thermoplastic layer 6 is put on so that the aluminium foil is completely covered. In the region where the hole has been cut out, the two thermoplastic layers 3 and 4 will be pressed together during the extrusion and sealed to each other. As can be seen from FIG. 3B the gas barrier layer 5 and the internal thermoplastic layer 6 too will be sealed together in the pouring opening. This sealing together of the different material layers in the pouring opening takes place during lamination under the influence of the heat and the pressure which act upon the material web when it passes the extrusion die and the rollers.

After the carrier layer 2 has been provided with the desired number of material layers the laminate web is made to pass a second set of punching tools by means of which the punching of holes is carried out once more at the locations in the material web where the earlier punching has taken place. However, in the second punching operation holes of a slightly smaller size than those in the earlier punching operation are cut out. As a result the holes cut through the packing laminate will be limited all round by an edge which is formed by the different thermoplastic layers of the packing laminate and the metal foil serving as a gas barrier. Under these conditions the cut edge 12 of the carrier layer 2 is sealed off by the thermoplastic layers converging in the edge 14 in such a manner that it cannot come into contact with the contents. To ensure a complete, liquid-tight sealing together of the layers comprised in the edge 14 and to prevent the cut edge of the metal foil 5 exposed in the second punching operation from coming into contact with the contents, a heating and processing of the edge 14 is carried out thereafter, so that the thermoplastic layers included are completely sealed together at the same time as they are made to flow out around the edge of the metal foil 5 and seal off the same. This can be carried out simply without requiring any additional material, since the thickness of the metal foil 5 only amounts to a fraction of the combined thicknesses of the different thermoplastic layers. As a typical value for the thickness of the layers present it can be said that the metal foil usually has a thickness of approx. 7 $\mu$m whilst the combined thermoplastic layers have a thickness which usually exceeds 100 $\mu$m.

The heating and the processing of the edge 14 in order to achieve the said sealing of the cut edge 12 of the carrier layer as well as of the cut edge of the metal foil 5 may be carried out in a special operation. It is preferable, however, to carry out this operation at the same time as the application and attachment of the cover strip 8 to the outside of the packing laminate. The cover strip 8 is placed in the desired position on the outside of the packing laminate, whereupon the region of the cover strip 8 which is straight in front of the edge 14 is subjected to heating and at the same time is pressed together with the edge 14. At this the thermoplastic layer 9 of the cover strip 8 facing towards the edge 14 will be sealed together in a liquid-tight manner so that a joint seal 11 is formed which extends around the pouring opening 7 and on the one hand seals off the cut edges of the carrier layer and of the gas barrier layer, and on the other hand seals the cover strip 8 in a liquid-tight manner to the packing laminate. Through a suitable formation of the tool which is used for the mechanical processing of the edge 14 in connection with the sealing, the corresponding part of the gas barrier layer 5 can be folded out against the cover strip 8 so that it will very nearly make contact with the barrier layer 9 of the cover strip and form a substantially coherent gas-tight layer in the opening region. Thus the occurrence of any subsequent gas exchange between the inside of the finished package and the surrounding atmosphere via the carrier layer 2 of the packing laminate or the outer thermoplastic layer 3 is prevented.

When an opening arrangement of the type which is illustrated in FIG. 2 is to be manufactured, the sealing layer 13 is applied subsequently in the form of a loose strip over the pouring opening and is sealed with the help of heat and pressure to the internal layer 6 of the packing laminate as well as to the thermoplastic layer 10 of the cover strip. The sealing layer 13 can be applied of course advantageously at the same time as the external cover strip 8, after the edge 14 has been processed in the manner described above in a previous operation.

When the packing laminate has been provided in conjunction with its manufacture with opening arrangements in accordance with the invention it can be handled in a conventional manner and be wound onto rolls for example for conveying it to the packing machines wherein the laminate is to be converted to individual packing containers. This conversion takes place in conventional manner and any special consideration in respect of the preapplied opening arrangements is normally not required. It has been found to function well in practice and the packing containers produced, provided with opening arrangements in accordance with the invention have met in full the demands laid down for liquid and gas tightness.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An opening arrangement for packing containers of the type for containing liquids, said containers formed from a laminate comprising a layer of fibrous carrier material with first and second sides, and a layer of thermoplastic on said first and second sides, the opening arrangement defined by a pouring opening provided in the laminate with a tear-off cover strip applied over the opening, the carrier layer material provided with an edge portion facing toward the pouring opening, the edge portion covered by said thermoplastic layers, said layers joined to each other so as to define a liquid-tight seal extending around the pouring opening.

2. An opening arrangement in accordance with claim 1, wherein the thermoplastic layers, in the packing laminate include layers of metal foil, the thermoplastic layers enclosing an edge of the foil facing the opening.

3. An opening arrangement in accordance with claim 1, wherein a sealing layer covers the pouring opening facing towards the interior of the packing container, the sealing layer joined to one of the thermoplastic layers of the packing laminate in a zone extending around the pouring opening and to the cover strip.

4. An opening arrangement in accordance with claim 3, wherein the sealing layer is defined by a separate liquid-tight thermoplastic strip sealed to the one of the thermoplastic layers of the packing laminate.

5. An opening arrangement in accordance with claim 4, wherein the one of the thermoplastic layers of the laminate as well as the sealing layer consist of polyethylene.

6. A method for manufacturing an opening arrangement for packing containers of the type for containing liquids, said containers formed from a laminate comprising a layer of fibrous carrier material with first and second sides and an edge portion facing toward a pouring opening, and a layer of thermoplastic on said first and second sides, the opening arrangement defined by the pouring opening provided in the laminate with a tear-off cover strip applied over the opening, including,
   (a) providing an opening of predetermined size in the carrier layer;
   (b) coating the carrier layer with at least one layer of the thermoplastic material on each of the first and second sides.
   (c) sealing the layers of thermoplastic material together by application of heat and pressure and covering the edge portion with the layers of thermoplastic material;
   (d) cutting an opening of predetermined size through the layers of thermoplastic material so as to expose the pouring opening; and,
   (e) sealing an external cover strip over the pouring opening and to the packing laminate.

7. A method in accordance with claim 6, wherein areas of the thermoplastic layers of the packing laminate situated along an edge of the pouring opening and sealed to one another are heated to softening temperature and processed so that the thermoplastic layers flow out and enclose in a liquid-tight manner an intermediate metal foil included in the packing laminate.

8. A method in accordance with claim 7, wherein the processing is done in conjunction with the sealing of the external cover strip.

9. A method in accordance with claim 6, wherein an internal sealing layer is applied over the pouring opening and sealed by heat and pressure inside of the packing laminate and to the cover strip.

10. An opening arrangement in accordance with claim 1, wherein a sealing layer covers the pouring opening facing towards the interior of the packing container, the sealing layer joined to one of the thermoplastic layers of the packing laminate in a zone extending around the pouring opening and to the cover strip.

* * * * *